(12) United States Patent
Fung et al.

(10) Patent No.: US 7,308,700 B1
(45) Date of Patent: Dec. 11, 2007

(54) NETWORK STATION MANAGEMENT SYSTEM AND METHOD

(75) Inventors: Anthony Fung, Pleasanton, CA (US); Peter Groz, San Jose, CA (US); Danny K. Hui, Newark, CA (US); Harry S. Hvostov, San Jose, CA (US); Bernard Saby, Foster City, CA (US)

(73) Assignee: STMicroelectronics, Inc., Carrollton ( * ) Notice: Subject to any disclaimer, the term of this patent is extended or adjusted under 35 U.S.C. 154(b) by 0 days.

(21) Appl. No.: 09/464,637

(22) Filed: Dec. 15, 1999

(51) Int. Cl.
H04N 7/173 (2006.01)
G06F 15/177 (2006.01)
G06F 15/173 (2006.01)

(52) U.S. Cl. .................. 725/111; 709/222; 709/223

(58) Field of Classification Search .................. 725/11; 717/148–178; 709/222–223
See application file for complete search history.

(56) References Cited

U.S. PATENT DOCUMENTS 6,393,569 B1* 5/2002 Orenshteyn .................. 713/201
6,588,016 B1* 7/2003 Chen et al. .................. 725/111

OTHER PUBLICATIONS

Arthur Little: Data Over Cable Technical Reports: Operations Support System Framework for Data Over Cable Services, 1996, entire document.*
Cable Labs, Data Over Cable Service Interface Specification: Cable Modem Telephony Return Interface Specification, 1997, entire document.*
Data Over Cable Service Interface Specification: Operations Support System Interface Specification, 1997, entire document.* http://www.davic.org/Download/Spec1_5/Final/cablemodem.pdf, Christof Ricken, Nov. 6, 1998.*

* cited by examiner

Primary Examiner—Hunter B. Lonsberry
(74) Attorney, Agent, or Firm—David V. Carlson; Lisa K. Jorgenson (57) ABSTRACT

A system and method for configuring and managing the connectivity of a broadband, cable modem network station to a network, including a state-driven network manager having a centralized error handling state and peripheral states for initialization, dynamic host configuration, configuration download, start simple-network-management, and an operational state. The operational state monitors for error and other messages communicated from other states and sends error messages to the centralized error-handling state and request messages to an operational support system interface management task. The error handling state receives error messages and requests error event logging from the operational support system interface management task. A change upstream-or-downstream channel task optimizes channel selection. The method includes initializing the network station to a predetermined set of parameters; creating and starting a dynamic-host-configuration protocol task; creating and starting a time-of-day task; creating and starting a configuration download task; creating and starting a simple-network-management protocol task; entering an operational state upon successful initialization of the network station and connectivity with the network, and, while in the operational state, monitoring the tasks for messages, including error messages and task messages; receiving error messages and initiating error recovery in response to the error messages; and receiving request messages and sending request messages to the operational support system interface management task.

20 Claims, 5 Drawing Sheets

NETWORK STATION MANAGEMENT SYSTEM AND METHOD

TECHNICAL FIELD

The present invention pertains to configuring and managing a network station for connectivity to a network, and, more particularly, to administering a broadband, cable modem network station.

BACKGROUND OF THE INVENTION

Figure 1:
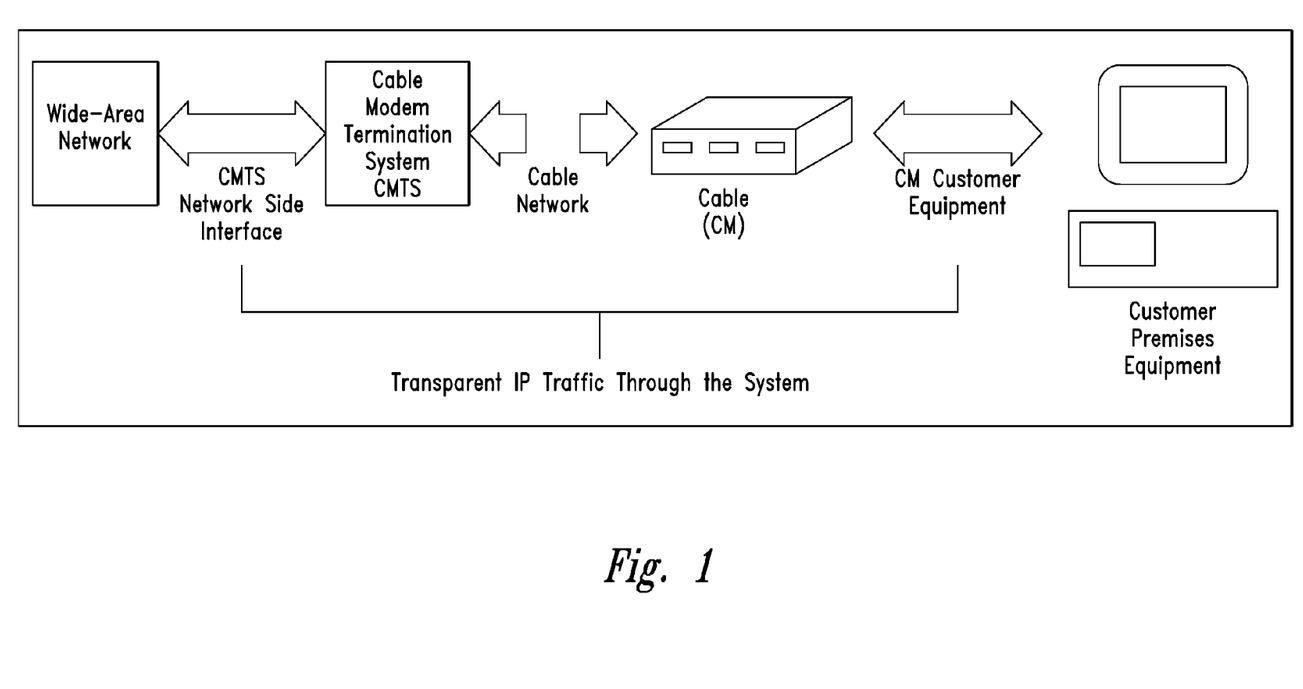
FIG. 1 is a diagram of transparent IP traffic through a data-over-cable system.

The transmission of high-speed data via cable television systems involves the bi-directional transfer of Internet Protocol (IP) traffic over a cable system, typically an all-coaxial or hybrid fiber-coax (HFC) cable network. More particularly, and with reference to FIG. 1, the transmission path over such a cable system is realized at the head end by a cable-modem-termination system (CMTS) and at each customer location by a cable modem (CM). At the head end (or hub), the interface to the data-over-cable system is known as the cable-modem-termination system network-side interface (CMTS-NSI). At the customer locations, the interface is known as the cable-modem to customer-premises-equipment interface (CMCI). The system functions to transparently transfer IP traffic between these interfaces, including, but not limited to, datagrams, Dynamic Host Configuration Protocol (DHCP), Internet Control Message Protocol (ICMP), and IP group addressing (broadcast and multicast).

To facilitate the early definition, design, development, and deployment of data-over-cable systems on a uniform, consistent, open, non-proprietary, multi-vendor interoperable basis, a Multimedia Cable Network System (MCNS) consortium has promulgated Data-Over-Cable Service Interface Specifications (DOCSIS). One aspect of DOCSIS that is of particular importance to the present invention is the radio-frequency interface specifications to which vendors must conform in developing and field testing hardware. More particularly, DOCSIS provides detailed specifications for the electrical characteristics and communication protocols that define an interoperable CM and CMTS system.

Figure 2:
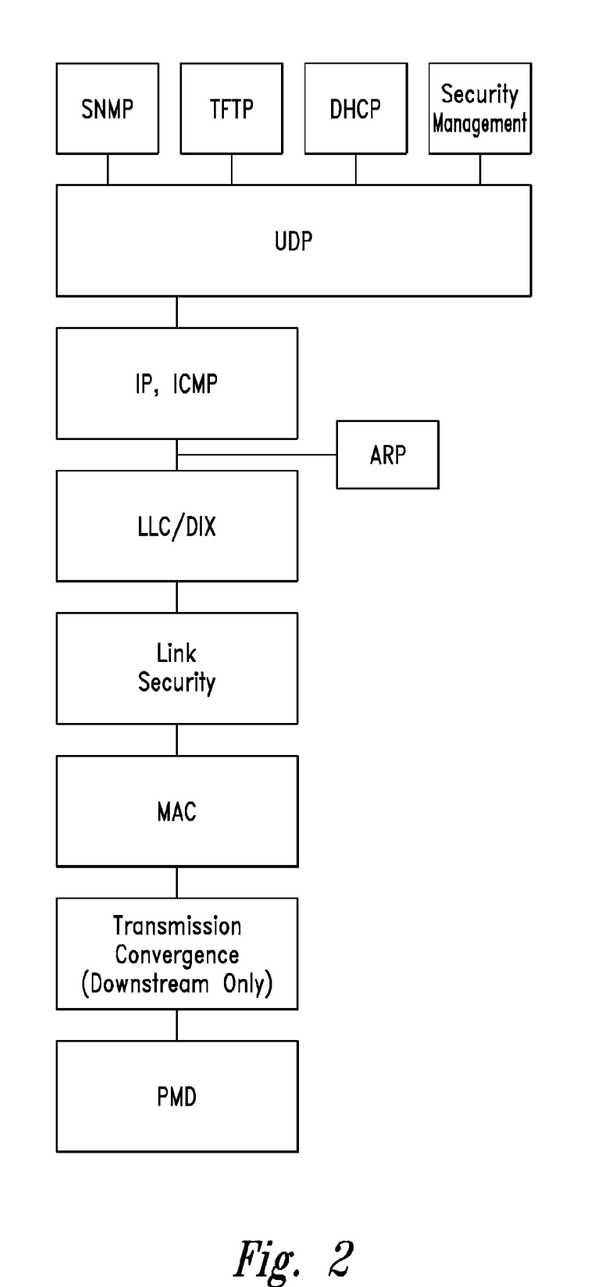
FIG. 2 is a diagram of a protocol stack on a radio frequency (RF) interface.
Figure 3:
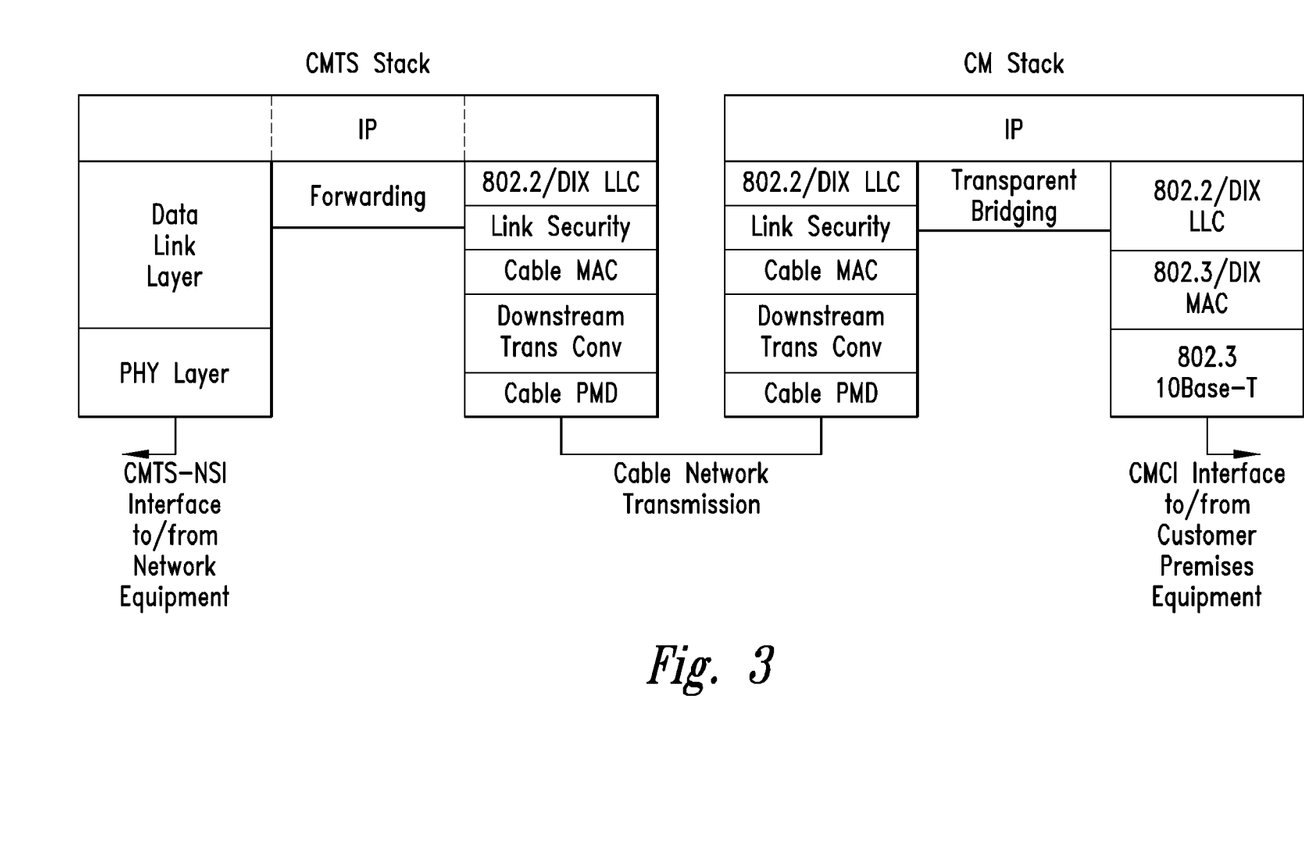
FIG. 3 is a diagram of Data forwarding through the CM and CM termination system (CMTS)
Figure 4:
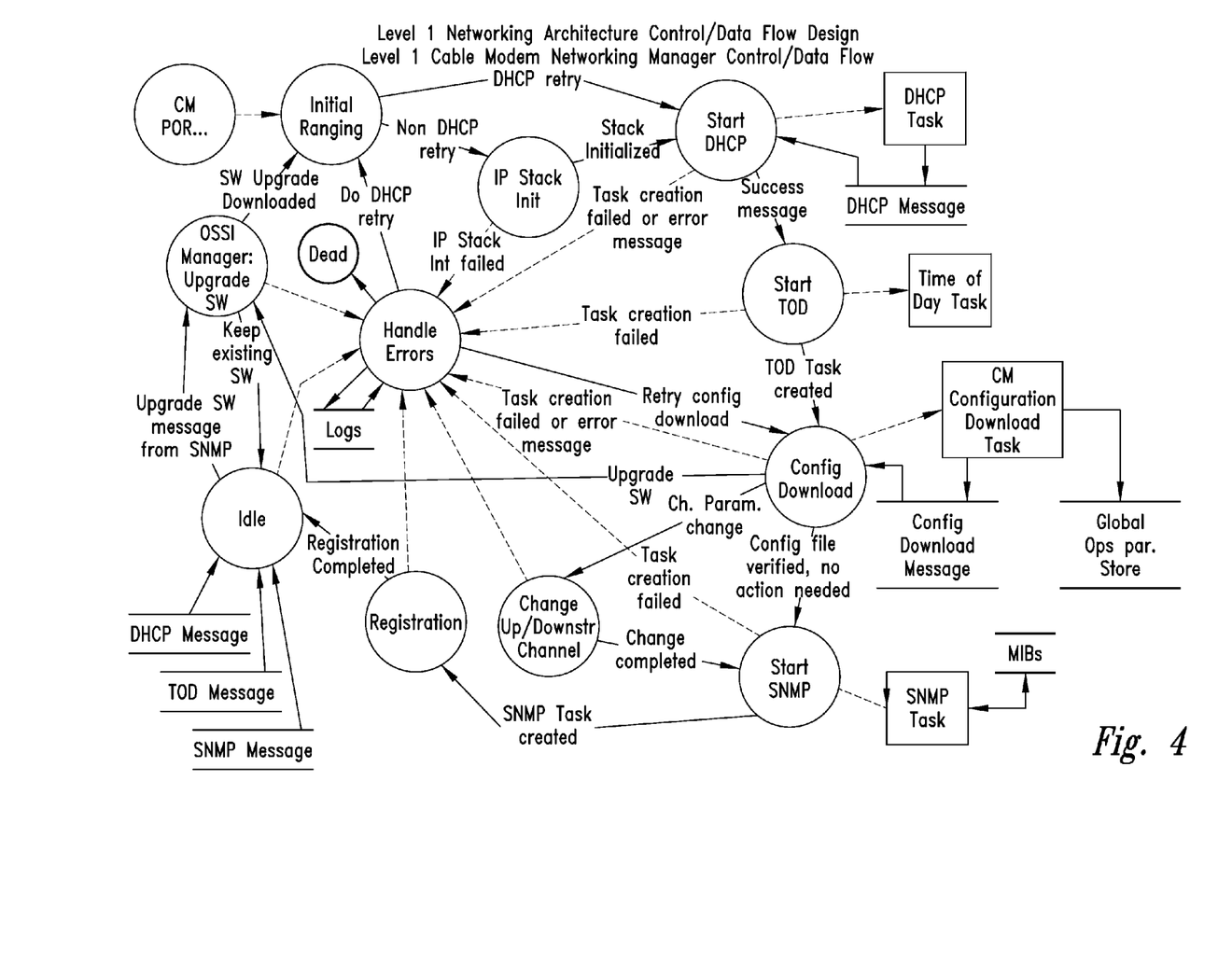
FIG. 4 is a state diagram illustrating level 1 networking architecture control/data flow for a cable modem IP connectivity manager in accordance with one embodiment of the present invention.
Figure 5:
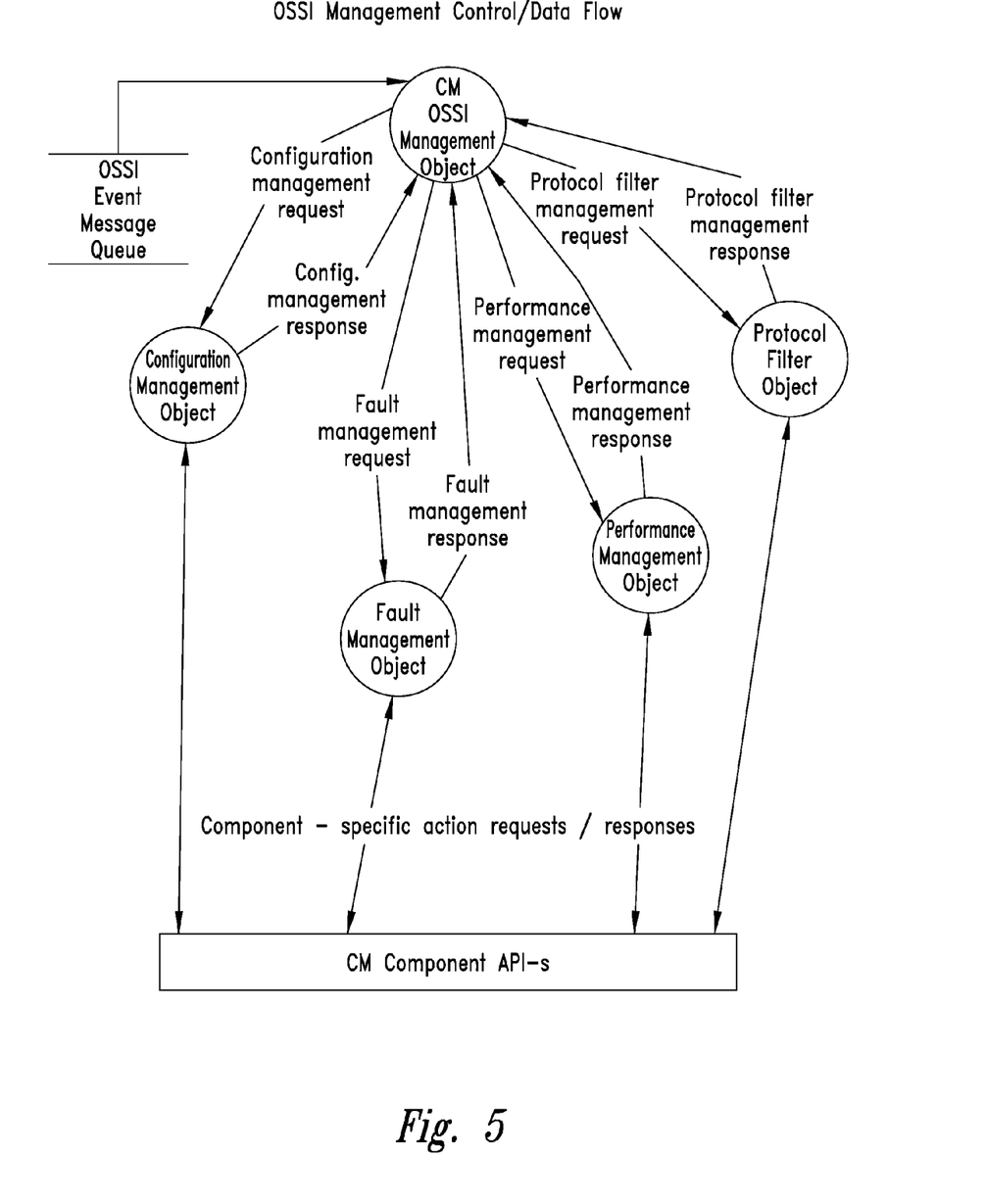
FIG. 5 is a state diagram illustrating the operations support system interface (OSSI) management control/data flow for use with the cable modem manager of FIG. 4.

Communication protocols are necessary because the CM and CMTS can operate both as forwarding agents and as end systems (hosts). Because these modes differ, the protocol stacks required for these modes must accommodate these differences. In addition, certain management functions ride on the IP packets. Shown in FIG. 2 is a protocol stack on the RF interface. The DOCSIS protocols also show, as depicted in FIG. 3, the CM and CMTS stacks for data forwarding through the CM and CMTS. Under the DOCSIS requirements, forwarding of IP traffic must be supported by the CM and CMTS.

Consequently, the CM must include configurable hardware and related software that meets DOCSIS requirements for establishing and maintaining connectivity to the cable system network.

SUMMARY OF THE INVENTION

The disclosed embodiments of the invention are directed to a network station manager for a network station that includes a management task component adapted to communicate with a plurality of task components to establish and manage the connectivity of the network station to a network. More particularly, a management task component is configured to initialize the network station and to maintain connectivity of the network station with a cable network, the management task component comprises a state machine configured to communicate with a plurality of task components.

In accordance with another aspect of this embodiment of the invention, the manager comprises a state machine that includes a centralized error handling state and peripheral states, including an initialization state, a start dynamic-host-configuration protocol state, a configuration-download state, a start simple-network-management protocol state, and an operational state, the operational state configured to monitor for error messages and other messages communicated from other states and to communicate the error messages to the centralized error handling state and to send request messages to an Operational Support System Interface (OSSI) management task.

The disclosed embodiments of the invention are further directed to a network station management method that includes initializing and configuring a cable network station using a state-driven machine according to a predetermined set of parameters to establish connectivity to a cable network; and managing the network station connectivity to the cable network.

In accordance with another aspect of the method of the disclosed embodiments of the present invention, the method includes initializing the network station to a predetermined set of parameters; creating and starting a dynamic-host-configuration protocol task; creating and starting a time-of-day task; creating and starting a configuration download task; creating and starting a simple-network-management protocol task; entering an operational state upon successful initialization of the network station and connectivity with the network, and, while in the operational state, monitoring the tasks for messages, including error messages and task messages; receiving error messages and initiating error recovery in response to the error messages; and receiving request messages and sending request messages to a request message management task.

BRIEF DESCRIPTION OF THE DRAWINGS

The following detailed description of the invention will be more readily understood when taken in conjunction with the following drawings, wherein.

DETAILED DESCRIPTION OF THE INVENTION

The Networking Manager is a cable modem management task interacting with the Application-layer Internet Protocol (IP) components in order to establish and to manage Internet Connectivity. These IP components are:

1. Dynamic Host Configuration Protocol (DHCP) Client
2. Trivial File Transfer Protocol (TFTP) for Configuration Download 3. Time of Day (TOD) Client
4. TFTP for New Software Download
5. Simple Network Management Protocol (SNMP) Agent Each application-layer component is designed to run as a separate task. The advantage of this solution is the uniform inter-task communication with all its benefits. Each of these tasks use a messaging system (in this particular case Operating System (OS) provided messaging system) and send data to the Networking Manager in the body of the messages. This task design also enables the Networking Manager to perform other cable modem management functions (improving CPU bandwidth utilization) by checking on the application-layer task messages only as needed. The TOD Client and the TFTP-based tasks were chosen to be tasks, there was no reason or requirement to design them to be independent tasks. Some of the application-layer tasks should to run as separate tasks for the reasons described below.

1. The DHCP Client should run a state machine of its own and interact with DHCP Servers as needed.
2. The SNMP Agent should be able to act and respond to an SNMP Manager instruction at any time.

The Operations Support System Interface (OSSI) Management component is designed on the Object Oriented Design concept base. The reason for this is to allow sufficient flexibility to deal with the ever-changing OSSI requirements largely depending on control mechanisms through Management Information Base (MIB) Objects. The cable modem OSSI Manager is a task created at boot time. It has its own message queue to receive work from the Application-layer tasks or from the Networking Manager task and it sends messages to the Networking Manager task.

The Media Access Control (MAC) functionality is controlled by the DOCSIS Driver task. All the details of this low-level control to the cable-side interface are de-coupled from the Networking Manager task this way. The Networking Manager task sends control messages and data to the DOCSIS Driver task and receives messages from it with completion information.

State Machine Concept

The State Machine design of the Networking Manager gives flexibility to the architecture. Decisions are made at the states on what the next state should be based on message contents and on DOCSIS specifications. Error processing is centralized in the Handle Errors State to enable the Networking Manager to analyze all its information available on the operational state of the cable modem. As DOCSIS evolves new functionality can be easily added and obsolete ones removed.

Control/Data Design

Tasks exchange data through messages and control their own data. Access to such data can happen only through Application Interfaces (API-s) provided by the tasks. The Network Manager task has control access to the Data Link Layer and to the MAC Layer. To hide complexity of these lower level layers and to protect their local data, additional API-s are designed to accomplish these goals.

1. Introduction

The Cable Modem Manager Task is responsible to initialize the Cable Modem according to the MCNS DOCSIS specifications. After the successful completion of the INITIAL RANGING the next step in the cable modem initialization is to Establish IP Connectivity. This design document describes a simplified Cable Modem Manager Task, suitable to integrate all of the Networking Components of an MCNS DOCSIS Cable Modem.

The actual implementation of the Cable Modem Manager Task may be more complex than the embodiment described herein. It will have a state machine implementing all the additional states of the Cable Modem initialization with more possible state transitions and more error handling/recovering. It is however quite complete with application interfaces (API-s) for the IP Connectivity Establishment part of the Cable Modem initialization and for the interactions between the Cable Modem Manager and the Networking Components. The embodiment described herein provides data and functions necessary for inter-task communication, resource sharing and error handling.

2. Functional Description

The Cable Modem Manager Task is a state-machine driven. After the successful completion of the INITIAL RANGING the IP Connectivity establishment follows. All of the networking components with the exception of the SYSLOG component run as separate tasks. The TFTP Task is created and deleted on demand. Upon successfully obtaining the Cable Modem Configuration file or downloading a new Cable Modem Software Upgrade the TFTP Task is terminated by the Cable Modem Manager Task. Tasks DHCP, TOD and SNMP stay running for the reasons below:

The DHCP Client is a state machine, and it handles the IP Address lease renewals.
The TOD task periodically updates the Local Network Time.
The SNMP Agent handles ongoing network management tasks.

Inter-task communication between the Cable Modem Manager Task and the Networking Component Tasks can happen through dedicated messages or through Cable Modem Manager Task provided API functions, as discussed more fully below. The handling of errors reported by the networking components is centralized by the functionality residing in the HANDLE ERRORS State. The IP Stack is kept running in most IP-related error recovery actions to facilitate quick recoveries.

The following basic steps are performed in the Cable Modem Manager Task context:

1. Initialize OS Kernel. (Starts Cable Modem Manager Task as the root task.)
2. Initialize Cable Modem Hardware.
3. Initialize message queues for Inter-task communications.
4. Initialize semaphore queues for Task resource sharing.
5. Start CM Manager State Machine.
6. Switch from current state to next state.
   6.1  Execute state functionality.
   6.2  If next state is the DEAD state
        Stay indefinitely in DEAD State.
   6.3  Else
        Go to step 6.

2.2 State Description 2.2.1 INITIAL RANGING State

This is the starting state of the CM IP Connectivity State Machine. There is no ranging functionality in this state. A stubbed function represents the Initial Ranging. To give the DHCP Client a second chance to get all the IP Connectivity Data the Cable Modem needs, the START DHCP State can get selected again. See the HANDLE ERRORS State for more details. It is important to note that the IP Stack gets initialized only once. Until SOFTWARE UPGRADE State is functional, this state is only used to get into the IDLE State. Next state can be the IP INIT, or the START DHCP State.

```
Pseudocode:
Cm_InitialRanging( ) state function:
   1.  call function: Initial Ranging( )
   2.  set cm_StateReturn value: SUCCESS
   3.  if previous CM State: HANDLE ERRORS is set
       3.1  if DHCP retries are left
            3.1.1  set next CM State to: START DHCP
            3.1.2  set CM Status bit: CM IP CONN REBOOT
            3.1.3  return: next CM State
   4.  if previous CM State: SOFTWARE UPGRADE
       4.1  set next CM State to: IDLE
       4.2  return: next CM State
   5.  set next CM State to: IP INIT
   6.  return: next CM State
```

2.2.2 IP INIT State

In this state the IP Stack is initialized. Next state is selected depending on the return value of the IP Stack initialization function. The 8021d Bridge component is set up to enable the IP connectivity establishment phase by enabling traffic between the IP stack and the DOCSIS Media Access Control (MAC).

```
Pseudocode:
cm_IpInit( ) state function:
   1.  call function: InitFusion( )
   2.  if returned SUCCESS
       2.1  call function: br_bridge_set(BRIDGE_UP,1)
       2.2  set next CM State to: START DHCP
       2.3  set CM Status bit: IP STACK RUNNING
       2.4  set cm_StateReturn value: SUCCESS
       2.5  return: next CM State
   3.  else
       3.1  set next CM State to: HANDLE ERRORS
       3.2  set cm_StateReturn value: SYS_RSR_MGMT_ERROR
       3.3  return: next CM State
```

2.2.3 START DHCP State

In this state the DHCP Task gets created and started. The DHCP Task starts the DHCP Client state machine in order to obtain:

an IP Address from a DHCP Server
IP Address(es) of Time Of Day Server(s)
IP Address of the TFTP Server (to access the CM Configuration file from)
IP Address(es) of Syslog Server(s)
all MCNS DOCSIS specified options The CM Manager will stay in this state and will wait for a completion message (blocking wait) from the DHCP Task. Next state is selected depending on the return value of the task creation and also on the message content returned by the DHCP Task. If all information delivered by DHCP has passed verifications, the IP Stack final setup is completed to set the IP address and the default router.

```
Pseudocode:
cm_StartDhcp( ) state function:
   1.  call function: start DHCP( )
   2.  if returned SUCCESS
       2.1  blocking wait for message from DHCP Task
       2.2  if message: DHCP SUCCESS
            2.2.1  Call boot_it2( ) to finish Fusion Stack initialization
            2.2.2  set CM Status bit: IP CONNECTIVITY
                   ESTABLISHED
            2.2.3  disable CM Manager-level DHCP retries
            2.2.4  set cm_StateReturn value: SUCCESS
            2.2.5  set next CM State to: START TOD
            2.2.6  return: next CM State
       2.3  else
            2.3.1  set in IP_ERRORS the DHCP error bit field
            2.3.2  set cm_StateReturn value: DHCP error received
            2.3.3  set next CM State to: HANDLE ERRORS
            2.3.4  return: next CM State
   3.  else
       3.2  set cm_StateReturn value: SYS_RSR_MGMT_ERROR
       3.3  set next CM State to: HANDLE ERRORS
   4.  return: next CM State
```

2.2.4 START TOD State

This is the state where the TOD (Time Of Day) Task is created and started. The TOD Task's role is to retrieve the Time Of Day from a TOD Server for Cable Modem internal event logging (time-stamping) purposes. Since DOCSIS allows TOD to run in parallel with other Cable Modem Manager and networking tasks, the CM Manager will check the completion result of the TOD Task in its IDLE State. The TOD Task will keep running, periodically updating the Local Network Time.

```
Pseudocode:
cm_StartTOD( ) state function:
   1.  call function: start TOD( )
   2.  if returned SUCCESS
       2.1  set_cm StateReturn value: SUCCESS
       2.2  set next CM State to: CONFIG DOWNLOAD
   3.  else
       3.1  set cm_StateReturn value: SYS_RSR_MGMT_ERROR
       3.2  set next CM State to: HANDLE ERRORS
   4.  return: next CM State
```

2.2.5 CONFIG DOWLOAD State

In this state the Config Download Task is created and started. The underlying TFTP Application uses the DHCP Client-supplied TFTP Server IP address to download the Cable Modem Configuration file from. Without a valid CM Configuration file the Cable Modem can not move on with the initialization process. For this reason the CM Manager Task will wait for the completion message from the Config Download Task. The DOCSIS required retry mechanism is implemented with a 10 minute wait after the Config Download Task's internal retries are exceeded. Note that Initial Ranging, Upgrade Software and Start SNMP states can also be entered as a result of going through this state.

```
Pseudocode:
cm_ConfigDownload( ) state function:
   1.  call function: start_Config_TFTP( )
   2.  if returned SUCCESS
```

-continued

```
Pseudocode:
    2.1  blocking wait for message from Config Download Task
    2.2  if message: TFTP SUCCESS
         2.2.1  set CM Status bit: CONFIG FILE OBTAINED
         2.2.2  set cm_StateReturn value: SUCCESS
         2.2.3  set max. number of CPE-s (Bridge API call)
         2.2.4  set provisioned MAC addresses (Bridge API call)
         2.2.5  analyze Configuration file
                2.2.5.1  if Upstream Channel disagreement
                             set next CM State to: INITIAL
                                 RANGING
                2.2.5.2  if new SW version found
                             set next CM State to: SW UPGRADE
                2.2.5.3  else
                             set next CM State to: START SNMP
         2.2.6  return: next CM State
    2.3  else
         2.3.1  set CM IP Errors to: returned TFTP error bits
         2.3.2  set cm_StateReturn value: CONF DOWNL ERROR
         2.3.3  set next CM State to: HANDLE ERRORS
         2.3.4  wait for 10 minutes
         2.3.5  return: next CM State
3.  else
    3.1  set cm_StateReturn value: SYS_RSR_MGMT_ERROR
    3.2  set next CM State to: HANDLE ERRORS
    3.3  return: next CM State
```

2.2.6 CHANGE UPSTREAM/DOWNSTREAM CHANNEL State

In this state the Cable Modem Manager changes the Upstream Channel ID to match the Configuration file supplied ID, overriding the selected Channel ID found during the Cable Modem initialization. After successful execution START SNMP state is selected as the next state.

```
Pseudocode:
    1.  call function: cm_ChgUpstrChannel( ) /* stub */
    2.  if returned SUCCESS
        2.1  set cm_StateReturn value: SUCCESS
        2.2  if previous CM State = START TFTP
                 set next CM State to: START SNMP
        2.3  else
                 set next CM State to: INITIAL RANGING
        2.4  return: next CM State
    3.  else
        3.1  set cm_StateReturn value: error code
        3.2  set next CM State to: HANDLE ERRORS
        3.3  return: next CM State
```

2.2.7 START SNMP State

When in this state, the SNMP Task is created and started. The SNMP Agent handles all the network management according to DOCSIS specification.

```
Pseudocode:
    1.  call function: start SNMP( )
    2.  if returned SUCCESS
        2.1  call function: br_ena_CpeSnmp( )
        2.2  set cm_StateReturn value: SUCCESS
        2.3  set next CM State to: REGISTRATION
        2.4  set CM Status bit: IP CONNECTIVITY ESTABLISHED
        2.5  return next CM State
    3   else
        3.1  set cm_StateReturn value: SYS_RSR_MGMT_ERROR
        3.2  set next CM State to: HANDLE ERRORS
        3.3  return: next CM State
```

2.2.8 REGISTRATION State

This is the final state of the CM IP Connectivity establishment in case all the previous stages of IP connectivity establishment completed successfully. A stubbed function represents the Registration process.

```
Pseudocode:
    1.  call function: cm_Registration( )
    2.  call br_bridge_set(FORWARDING_ENABLED, 1) to
            enable full 802.1d Bridge functionality
    3.  set CM Status bit: BRIDGE FULL FUNCT
    4.  set cm_StateReturn value: SUCCESS
    5.  set next CM State to: IDLE
    6.  return: next CM State
```

2.2.9 IDLE State (Operational State)

Once the CM is fully functional and able to operate and respond, the CM Manager enters this state. After entering this state the CM Manager Task stays in a loop and it will:

Poll the IP ERRORS data structure for errors reported by the Networking components. If an error is detected, the HANDLE ERRORS state will be forced.

Poll the CM STATUS data structure to test if Time Of Day was obtained.

Poll for a message from the SNMP Task indicating that a software download is to be performed. If this message is received, SW UPGRADE state will be forced.

```
Pseudocode:
    1.  if IP connectivity is set up, send SNMP Trap: Link Up
    2.  poll TOD message queue
        2.1  if TOD message received
             2.1.1  cm_StateReturn value: TOD completion
             2.1.2  if TOD completed successfully
                    2.1.2.1  set CM Status bit: TOD ESTABLISHED
             2.1.3  else
                    2.1.3.1  set next CM State to: HANDLE ERRORS
                    2.1.3.2  return: next CM State
    3.  poll DHCP message queue
        3.1  if DHCP message received
             3.1.1  get cm_StateReturn value: DHCP completion
             3.1.2  if DHCP completion error
                    3.1.2.1  set next CM State to: HANDLE ERRORS
                    3.1.2.2  send SNMP Trap: Link Down
                    3.1.2.3  return: next CM State
    4.  poll SNMP message queue
        4.1  if DHCP message received
             4.1.1  get cm_StateReturn value: from SNMP message
             4.1.2  if message = SNMP SW UPGRADE
                         set next CM State to: SOFTWARE UPGRADE
             4.1.3  if message = SNMP DEV RESET
                         set next CM State to: INITIAL RANGING (until
                             Reset State. implementation)
    5.  if no message in TCID, DHCP and SNMP queues
            go back to 2.
```

2.2.10 SW UPGRADE State

This state may be part of the Operations Support System Interface (OSSI) Management. As it is implemented herein, upon entering this state start-Upgrade is called to create the SW Upgrade Task. This Task completes the SW Upgrade process using the TFTP protocol and information supplied by the Cable modem's SNMP Agent or based on the Configuration file's Software Upgrade filename. Since there are two different mechanisms to download the new upgrade, the argument passed in start_Upgrade( ) is different.

The code just selects INITIAL RANGING as next state on success.

```
Pseudocode:
    1.  set CM Status bit: UPGRADING SOFTWARE
    2.  call br_bridge_set(FORWARDING_ENABLED, 0)
    3.  call start_Upgrade( ) to create the SW Upgrade Task
        3.1  if previous state = START TFTP
                argument: TFTP_UPGRADE
        3.2  else
                argument: SNMP_UPGRADE
    4.  if returned SUCCESS
        4.1  blocking wait for message from SW Upgrade Task
            4.1.1  if download completed successfully
                4.1.1.1  set cm_StateReturn: SUCCESS
                4.1.1.2  set next CM State to: INITIAL RANGING
                4.1.1.3  call br_bridge_set(FORWARDING_
                         ENABLED, 1)
                4.1.1.4  return: next CM State
            4.1.2  else
                4.1.2.1  set cm_StateReturn: SW DOWNLOAD
                         ERROR
                4.1.2.2  set next CM State to: HANDLE ERRORS
                4.1.2.3  return: next CM State
    5.  else
        5.1  set cm_StateReturn value: SYS_RSR_MGMT_ERROR
        5.2  set next CM State to: HANDLE ERRORS
        5.3  return: next CM State
```

2.2.11 HANDLE ERRORS State

This state is entered after an error condition has been detected in any of the states except for the DEAD State. Depending on the error code received error recovery and error logging is done. If no recovery is possible the DEAD State will be selected to enter next. A System Resource Management Error is an error that prevents the IP Stack initialization or the creation of any of the DHCP, TOD, TFTP or SNMP Tasks due to resource allocation problems.

Notes:

1. SYSLOG Event Reporting can be disabled by the CMTS (see DOCSIS OSSI 103 Specification's Section 2.3.2).

2. DOCSIS Network Operators can throttle the rate of SYSLOG event reporting (see DOCSIS OSSI 103 Specification's Section 2.3.3.1).

```
Pseudocode:      function: cm_Handle_Errors( )
Prepare_syslog_msg( ) pseudocode:
    1.  analyze reported error (in cm_StateReturn)
    2.  case: SYSTEM RESOURCE MGMT ERROR
        2.1  set next CM State to: DEAD
        2.2  break
    3.  case: DHCP ERROR
        3.1  if CM Manager-level DHCP retries are left
             (cm_dhcp_retry != 0)
             3.1.1  set CM Status bit: CM IP CONN REBOOT
             3.1.2  reset CM Status bit: IP CONN ESTABLISHED
             3.1.3  set next CM State to: INITIAL RANGING
             3.1.4  break
        3.2  else
             3.2.1  set next CM State to: DEAD
             3.2.2  break
    4.  case: CONF DOWNL ERROR
        4.1  if CM Manager-level Conf Download retries are left
             (cm_conf_retry != 0)
             4.1.1  set next CM State to: CONFIG DOWNLOAD
             4.1.2  break
        4.2  else
             4.2.1  reset CM Status: bit: IP CONN ESTABLISHED
             4.2.2  set next CM State: DEAD
             4.2.3  break
    5.  case: TOD ERROR
        5.1  set next CM State: DEAD
        5.2  break
    6.  if SYSLOG reporting and I' Connectivity are true
        6.1  if CM is not in throttling state
             6.1.1  call syslog_message( ) to send Logged errors/events
                    if any
             6.1.2  call syslog_messsage( ) to send Current error
                    reported
    7.  else
             call cm_LogError( ) to log current error
    8.  return next CM State
```

2.2.12 DEAD State

This state is entered if no recovery can be done from an error reported to the Cable Modem Manager.

Pseudocode:

1. call snmp_link_down( ) to send SNMP Trap 2. set next CM State: DEAD 3. return: next CM State

3. Data Design

3.1 Cable Modem State and Status Information

```
Data structure definitions in cm_manager.h:
typedef struct tagCM_STATUS{
    int             fReserved1              :21;
    int             bCmipConnReboot         :1;
    int             bIpStackRunning         :1;
    int             bipConnEstablished      :1;
    int             bConfigFileObtained     :1;
    int             bBridgeFullFunct        :1;
    int             bTodEstablished         :1;
    int             bSysiogEnabled          :1;
    int             bSnmpTrapEnabled        :1;
    int             bLogRateThrottled       :1;
    int             bUpgradingSoftware      :1;
    int             fReserved2              :1;
}CM_STATUS:
typedef struct tagIP_ERRORS {
    int             fReserved               :3;
    int             fDhcpErrors             :5;
    int             tTftpErrors             :5;
    int             fTodErrors              :3;
}IP_ERRORS;
The bit-fields of IP_ERRORS are set like this:
Example: fDhcpErrors
    Bit 0 = 1    if NO_DHCP_SERVER      is reported
    Bit 1 = 1    if NO_RESP_FOR_REQ     is reported
    Bit 2 = 1    if WRONG_RESP_TYPE     is reported
    Bit 3 = 1    if REQ_NOT_SUPPORTED   is reported
    Bit 4 = 1    if RESP_FIELD_ERROR    is reported
typedef struct tagCM_INFO_BLOCK {
CM_STATUS cm_funct_status;
IP_ERRORS ip_conn errors;
}EM_INFO_BLOCK;
Cable Modem Manager State definitions:
enum {
    INITIAL_RANGING,
    IP_STACK_INIT,
    START_DHCP,
    START_TOD,
    CONFIG_DOWNLOAD,
    CHANGE_UPSTR_CHANNEL,
    START_SNMP,
    REGISTRATION,
    IDLE,
    SOFTWARE_UPGRADE,
    HANDLE_ERRORS,
    DEAD,
```

-continued

```
    POWER_ON,
    MAX_CM STATES,
    CM_EXCEPTION
};
```

3.2 Cable Modem Task Error/Completion Codes

All IP Connectivity components reporting CM Error Codes include the cm_manager.h module with the error code definitions. There are 11 error groups defined by DOCSIS (see Appendix J of RFI version 1.1).

```
/* CM Error Group Code: 0x0A */
/* Group 10 error codes: CM Net Configuration Download and Time of
Day */
/* DHCP-related error code types */
typedef enum {
        NO_DHCP_SERVER      = 0XA0100,
        NO_RESP_FOR_REQ     = 0XA0200,
        WRONG_RESP_TYPE     = 0XA0201,
        REQ_NOT_SUPPORTED   = 0XA0300,
        RESP_FIELD_ERROR    = 0XA0301
}dhcp_error_code_t;
For TOD, TFTP and Internal Error-related error codes see the
cm_manager.h file.
/* SNMP-related message code types types */
typedef enum {
     SNMP_SW_UPGRADE = 0xD0100,
     SNMP_DEV_RESET = 0xD0200
}snmp_return_code_t;
```

3.3 DHCP Message Data Design

The message created by the DHCP Task is a 32-bit value and it is sent to the Cable Modem Manager Task.

If DHCP Task found no errors Message content=0

Else

Message content=Cable Modem DHCP Error Code according to section 3.2 above.

3.4 Config Download (TFTP) Message Data Design

The message created by the CONFIC') DOWNLOAD Task is a 32-bit value and it is sent to the Cable Modem Manager Task.

If CONFIG DOWNLOAD Task found no errors

Message content=0

Else

Message content=Cable Modem CONFIG DOWNLOAD Error Code according to cm_manager.h file.

3.5 TOD Message Data Design

The message created by the TOD Task is a 32-bit value and it is sent to the Cable Modem Manager Task. This message is read in the Cable Modem Manager's IDLE State.

If TOD Task found no errors

Message content=0

Else

Message content=Cable Modem TOD Error Code according to cm_manager.h file.

3.6 SNMP Message Data Design

The message created by the SNMP Task is a 32-bit value. It contains the SNMP_SW_UPGRADE or the SNMP_DEV_RESET value. This message is read in the Cable Modem Manager's IDLE State.

4. Code Design

The two new code modules added are cm_manager.c and cm_manager.h modules. The harness.c boot module is no longer used.

4.1 Module CM_MANAGER.C

This module contains the main functions as shown in section 4.1.1.

4.1.1 Main code

```
Pseudocode:
    1.  Initialize OS
    2.  Initialize Hardware
    3.  Create Semaphore Queues
    4.  Create Inter-task Message Queues
    5.  Initialize CM Manager Retry Counters
    6.  Initialize CM Manager Data (CM Info Block)
    7.  Initialize the Bridge component's data structures
    8.  Initialize CM Manager State Machine to INITIAL
        RANGING state
    9.  Run CM Manager State Machine (do forever)
        9.1 If Wrong State
            9.1.1  Print warning to serial port
        9.2 Else
            9.2.1  Execute state functionality
            9.2.2  Set next CM Manager state (Based on return value)
    10. Return to step 8.
```

4.1.2 IP-supporting Functions void create-ip_message_queues(void)

Creates all the message queues used by IP-related Tasks for inter-task communication with the Cable Modem Manager Task.

The message queues are initialized with:

| size_t | MessageSize = 4; | /* 4 Bytes */ |
| u32 | MaxMessages = 1; | | void create_ip_semaphore_queues(void)

Creates all the semaphore queues used by IP-related Tasks to access Cable Modem Manager controlled information.

void cm_LogError(char *cm_ErrMsg)

This function logs the MCNS DOCSIIS specified error. No details yet on the logging process.

void cm_clear_IPErrors(void)

Clears the content of the IP_ERRORS structure.

void cm_set_IPError(int ip_Error)

Sets the bit of the corresponding bit-field in IP_ERRORS based on the argument.

void cm_clear_CmStateAndStatus(void)

Clears the content of the CM_STATE and the CM_STATUS structures.

4.1.3 API Functions Provided for Networking Components void cm_set_CmIpStatus(int ipStatusValue)

Based on the value:

1. Modify CM_STATUS structure bits to reflect functionality change.

2. Set the appropriate bits in the IP_ERRORS structure as needed.

Write access to CM_STATUS is controlled by a semaphore.

CM_STATUS CmStatus cm_read_CmIpStatus(void)

Returns the caller the current Cable Modem status information stored in CM_STATUS structure. Currently DHCP. Task is the user, but potentially more tasks can request it.

4.2 Functions Provided by Networking Components for CM Manager Task 4.2.1 Bridge Component void br_bridge_init (void)

Function supplied by the Bridge component to initialize Bridge data structures. For more details see br_if.h file.

int br_bridge_set (bridge_cmd parameters int value)

Function supplied by the Bridge component. For details see bridge_if.h file.

Possible settings are:

1. Enable traffic between Fusion and MCNS MAC (true or false)

2. Enable forwarding between CIPE interface & MCNS MAC (true or false)

3. Set the maximum number of supported CPE's (min:1, max:MAX-CPE)

int br_provision_CPE (a48 address)

Function supplied by the Bridge component. The argument is a CPE MAC address from the Cable Modem Configuration file read during CONFIG DOWNLOAD State. For more details see bridge_if.h file.

void br_ena_CpeSnmp(void)

Function to be supplied by the Bridge component. The function enables SNMP queries originating from a CPE and SNMP responses generated by the Cable Modem to this CPE according to DOCSIS OSSI 103 Specification's Section 2.3.1.

4.2.2 SYSLOG Component int syslog_message(char *pmsg)

Function supplied by Syslog component. The argument is a pointer to the syslog message string. Return values as defined in sysloginc.h file.

int syslog_close_socket(void)

Function supplied by Syslog component. A socket for syslog is open all the time unless the CM Manager decides to close it. Return values as defined in sysloginc.h file.

4.2.3 SNMP Component void snmp_link_up(struct netdev * ndp)

Function supplied by SNMP component to send a Link Up SNMP Trap to the SNMP Server by the CM Manager.

snmp_link_down(struct netdev * ndp)

Function supplied by SNMP component to send a Link Down SNMP Trap to the SNMP Server by the CM Manager.

5. Cable Modem OSSI System Architecture Design 5.1 Introduction

OSSI events are typically the result of a remote SNMP Manager write action to a specific MIB object. Some of the write actions require a response from the Cable Modem (like SW upgrade download) and some will result in control actions to be taken (like throttling of event reporting).

The Networking Task Components communicate OSSI events to the OSSI Manager Task through OSSI Event Messages. The CM Manager Task invokes the appropriate methods inside the CM Management Object to process the event message.

After validation a request is generated (invoking a method at the lower layer object). The request is processed and the lower layer management object generates a CM component-specific action using the appropriate API-S. A response is generated to the OSSI Management Object.

5.2 OSSI Object Requirements

The OSSI Management Object is instantiated during the CM Initialization. The next layer management objects may be instantiated dynamically as needed. All CM Components expose appropriate API-s to the OSSI management objects.

5.2.1 OSSI Management
Process OSSI Event Messages
Validate Requests
Generate Management Requests
Process Responses 5.2.2 Configuration Management
Download SW Upgrade Control and Execution 5.2.3 Fault Management
Enable SNMP Access from CF3E Ethernet Interface
Enable ICMP Echo (ping) from CPE Ethernet Interface
Send SNMP Traps to defined SNMP Managers
Log Events (SNMP and/or SYSLOG)
Throttle SNMP Traps and/or SYSLOG messages 5.2.4 Performance management
Upstream Channel Management through MIB-s
Bridge Traffic Management MIB-s
Interfaces MIB-II Group for Channel Loss Diagnosis 5.2.5 Protocol Filter Management
LLC, Layer 4, Port-based Filtering Management through MIB-s 5.3 CM Component API-s
Initialize Version Control MIB Objects
Modify MI B Object Access per CM Configuration File
Write MIB Objects Read MIB Objects
SW Upgrade Task Creation
Bridge Enable/Disable ICMP Access from CPE
Bridge Enable/Disable SNMP Access from CPE
Send SNMP Trap
Create SNMP Event Log
Bridge Filtering Control From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A network station manager for a cable modem network station, comprising:
a management task component configured to initialize the network station and to maintain connectivity of the network station with a cable network, the management task component comprising a state machine configured to communicate with a plurality of task components; and
a centralized error handling state and peripheral states comprising an initialization state, a start dynamic-host-configuration protocol state, a configuration-download state, a start simple-network-management protocol state, and an operational state, the operational state configured to monitor for error messages and other messages communicated from other states and to communicate the error messages to the centralized error handling state and to send request messages to an Operational Support System Interface (OSSI) management task.

2. The network station manager of claim 1 wherein the OSSI management task comprises a start software upgrade task configured to respond to a software upgrade message and initiate upgrading of software.

3. The network station manager of claim 1 wherein the error handling state is configured to receive a reported error detected in one or more of the states, to request error event logging from the OSSI management task, and to initiate error recovery, and, when error recovery is not possible, to enter a dead state.

4. The network station manager of claim 1, further comprising an initialization state configured to initialize an Internet Protocol (IP) stack.

5. The network station manager of claim 4 wherein the initialization state further configured to initialize a bridge component to enable communication between the IP stack and a media access control component.

6. The network station manager of claim 1, further comprising a start dynamic-host-configuration protocol state configured to initiate creation and commencement of a dynamic-host-configuration protocol task.

7. The network station manager of claim 1, further comprising a configuration-download state configured to start a configuration-download task.

8. The network station manager of claim 1 wherein the start simple-network-management protocol state is configured to start a simple-network-management protocol task.

9. The network station manager of claim 1, further comprising a change upstream-or-downstream-channel state configured to change an initial upstream channel identification to match a predetermined channel identification.

10. The network station manager of claim 1, further comprising a start time-of-day state configured to initiate the creation and commencement of a time-of-day task component.

11. The network station manager of claim 10 wherein the time-of-day task component is configured to run in parallel with the management task component and periodically update the network time local to the management task component.

12. A method of administering a broadband, cable modem network station for connectivity to a network, the method comprising:
   implementing an administration method internal to a cable modem, comprising:
   initializing the network station to a predetermined set of parameters including a centralized error handling state and peripheral states, which include an initialization state;
   creating and starting a dynamic-host-configuration protocol task;
   creating and starting a time-of-day task;
   creating and starting a configuration download task;
   creating and starting a simple-network-management protocol task;
   entering an operational state upon successful initialization of the network station and connectivity with the network, and, while in the operational state, monitoring the tasks for messages, including error messages and task messages;
   receiving error messages and initiating error recovery in the centralized error handling state in response to the error messages; and
   receiving request messages and sending request messages to a request message management task.

13. The method of claim 12 wherein starting the dynamic-host-configuration protocol task comprises receiving one or more of the following:
   an IP address from a dynamic-host-configuration protocol server, an IP address of a time-of-day server, an IP address of a trivial-file-transfer protocol server, an IP address of a SYSLOG server.

14. The method of claim 12 wherein the creating and starting the time-of-day task comprises:
   obtaining time-of-day from a time-of-day server; and
   continuously updating the time-of-day task to update local time in the network station.

15. The method of claim 12 wherein the creating and starting the configuration-download task comprises downloading a network station configuration file through a trivial-file-transfer protocol task; and
   sending a completion message when the configuration-download task is finished and otherwise sending an error message.

16. The method of claim 15, further comprising receiving a change upstream-or-downstream-channel message;
   changing the upstream or downstream channel identification to match a channel identification in the change upstream-or-downstream-channel message; and
   sending request messages to a message management task.

17. The method of claim 12 wherein the creating and starting the simple-network-management protocol task comprises establishing connectivity with simple-network-management managers.

18. The method of claim 12, further comprising:
   receiving a software upgrade message;
   starting a software upgrade task to upgrade software in accordance with the message; and
   reinitializing the network station upon completion of the software upgrade.

19. The method of claim 18 wherein starting the software upgrade task comprises communicating with an operation support-system-interface management task to start the software upgrade task.

20. The method of claim 12 wherein initiating the network station further comprises creating an operation support-system-interface management task.

* * * * *